United States Patent
Teng

(10) Patent No.: US 7,924,880 B2
(45) Date of Patent: Apr. 12, 2011

(54) METHOD AND SYSTEM FOR ESTABLISHING HIERARCHICAL NETWORK WITH PROVIDER BACKBONE BRIDGES

(75) Inventor: Xindong Teng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/272,209

(22) Filed: Nov. 17, 2008

(65) Prior Publication Data

US 2009/0073997 A1  Mar. 19, 2009

Related U.S. Application Data

(63) Continuation of application No. PCT/CN2006/003637, filed on Dec. 28, 2006.

(30) Foreign Application Priority Data

May 18, 2006  (CN) .......................... 2006 1 0081150

(51) Int. Cl.
*H04L 12/28* (2006.01)
*H04L 12/66* (2006.01)
*H04L 12/26* (2006.01)
*H04L 12/12* (2006.01)

(52) U.S. Cl. ........ 370/471; 370/401; 370/255; 370/351; 370/392; 370/469; 709/220; 709/238

(58) Field of Classification Search .................. 370/254, 370/255, 351, 389, 392, 401, 469, 471; 709/220, 709/238, 242

See application file for complete search history.

(56) References Cited

U.S. PATENT DOCUMENTS 6,618,388 B2 * 9/2003 Yip et al. ...................... 370/401

(Continued)

FOREIGN PATENT DOCUMENTS

CN        1765085 A        4/2006

(Continued)

OTHER PUBLICATIONS

McDonough et al., "IEEE 802.1ad Concepts and Architectures Overview," *International Telecommunication Union*, Study Group 15: 1-9 (Oct. 2003).

(Continued)

*Primary Examiner* — Chi H Pham
*Assistant Examiner* — Ahmed Elallam
(74) *Attorney, Agent, or Firm* — Leydig, Voit & Mayer, Ltd.

(57) ABSTRACT

A method for establishing a hierarchical network with Backbone Provider Bridges includes: dividing the network into a plurality of layers, and partitioning each layer into at least one domain; each domain assigning a service tag for itself; a local domain sending a mapping request including a user type ID to a further domain in the same layer; the further domain in the same layer returning a service tag corresponding to the user type ID to the local domain; the local domain establishing and saving a mapping relationship; and edge devices of each domain learning MAC addresses. Further, a system and device having the same are also provided in the disclosure.

6 Claims, 7 Drawing Sheets

U.S. PATENT DOCUMENTS

| | | | |
|---|---|---|---|
| 6,711,163 B1 | 3/2004 | Reid et al. | |
| 7,453,888 B2 * | 11/2008 | Zabihi et al. | 370/400 |
| 7,801,039 B2 * | 9/2010 | Monette et al. | 370/230.1 |
| 7,835,370 B2 * | 11/2010 | Sajassi | 370/401 |
| 2002/0089992 A1 | 7/2002 | Yip et al. | |
| 2004/0042454 A1 | 3/2004 | Zabihi et al. | |
| 2004/0184408 A1 * | 9/2004 | Liu et al. | 370/236 |
| 2005/0286541 A1 | 12/2005 | Bottorff et al. | |
| 2006/0002370 A1 * | 1/2006 | Rabie et al. | 370/351 |
| 2006/0245438 A1 | 11/2006 | Sajassi et al. | |
| 2006/0248227 A1 | 11/2006 | Hato et al. | |
| 2007/0076719 A1 * | 4/2007 | Allan et al. | 370/392 |
| 2007/0098006 A1 * | 5/2007 | Parry et al. | 370/437 |
| 2007/0116045 A1 * | 5/2007 | Mohan et al. | 370/466 |
| 2008/0019385 A1 * | 1/2008 | Sultan et al. | 370/401 |

FOREIGN PATENT DOCUMENTS

| | | |
|---|---|---|
| EP | 1398920 A2 | 3/2004 |
| WO | WO 2006/002230 A2 | 1/2006 |
| WO | WO 2006002230 A2 * | 1/2006 |
| WO | WO 2006/118696 A2 | 11/2006 |

OTHER PUBLICATIONS

Ahmad et al., "Interconnecting High-Speed LANs and Backbones," *IEEE Network*, 7(3): 36-43 (Sep. 1993).

IEEE Standards, "Virtual Bridged Local Area Networks," IEEE Computer Society, Sponsored by the LAN/MAN Standards Committee, IEEE 802.1Q™ (May 7, 2003).

IEEE Standards, "Virtual Bridged Local Area Networks-Amendment 4: Provider Bridges," Sponsored by the LAN/MAN Standards Committee, IEEE P802.1ad/D6.0, Draft Amendment to IEEE Std 802.1Q (Aug. 17, 2005).

IEEE Standards, "Virtual Bridged Local Area Networks-Amendment 6: Provider Backbone Bridges," Sponsored by the LAN/MAN Standards Committee, IEEE P802.1ah/D1.2, Draft Amendment to IEEE Std 802.1Q-REV (Aug. 18, 2005).

1st Office Action in corresponding European Application No. 06840679.2 (Dec. 16, 2010).

* cited by examiner

METHOD AND SYSTEM FOR ESTABLISHING HIERARCHICAL NETWORK WITH PROVIDER BACKBONE BRIDGES

CROSS-REFERENCE TO RELATED APPLICATIONS

This application is a continuation of International Patent Application No. PCT/CN2006/003637, filed Dec. 28, 2006, which claims priority to Chinese Patent Application No. 200610081150.5, filed May 18, 2006, both of which are hereby incorporated by reference in their entirety.

TECHNICAL FIELD

The disclosure relates to network communication technology, and more particularly, to a method and system for establishing a hierarchical network with provider backbone bridges, and to a method and device using the system for data transmission.

BACKGROUND

Media Access Control (MAC) address is a unique number for identifying a network adapter after it is manufactured. Provider Backbone Bridges (PBB) (also known as Mac-in-Mac), together with QinQ (a transmission technology using an inner-layer 802.1Q tag encapsulated with an outer-layer 802.1Q tag), make it possible for the whole transmission network (Layer 2 network) to base on the Ethernet architecture, thereby allowing Metropolitan Area Network (MAN) and even Wide Area Network (WAN) to be realized by Ethernet technology from the access layer through the aggregation layer to the backbone layer. Thus, PBB is a crucial trend in Ethernet development, because Ethernet is of low cost and easy to use. With the advance of Mac-in-Mac technology and carrier Ethernet related features, such as the improvement on Quality of Service (QoS) and Operation Administration and Maintenance (OAM), MAN Ethernet and WAN Ethernet will be developed rapidly and Mac-in-Mac technology will get wider and wider applications.

Mac-in-Mac technology, capable of solving the scalability problem of Ethernet, is mainly applied to provider backbone network, and also applied to similar situations, such as the access layer and the aggregation layer. Mac-in-Mac differs from QinQ mainly in that: QinQ requires that all of the nodes learn a user's MAC address, which imposes a strict requirement on the nodes; while for Mac-in-Mac it only needs to maintain a user's address at the edge nodes.

FIG. 1 illustrates a typical example of applying Mac-in-Mac in networking. Here, the Mac-in-Mac technology is used in the backbone network. This means the backbone edge nodes support Mac-in-Mac, while the intermediate nodes are not required to support Mac-in-Mac. The intermediate nodes can be ordinarily switches supporting 802.1Q. Network-Provider Edge (N-PE) supports both Mac-in-Mac and QinQ, while the access layer only supports QinQ. The backbone layer and the access layer perform Spanning Tree Protocol (STP), respectively, to create their respective forwarding trees.

During the transmission of a user packet in a network, the detailed process is as follows:

After a user accesses a User Provider Edge (U-PE), different Virtual Local Area Network tags (designated as S-VLAN) are assigned to the user, according to the service type or the user type. There are 4094 total tags for S-VLAN. The user packet is encapsulated by means of QinQ, and then goes through the following transformation:

| C-DA | C-SA | C-TAG | DATA | C-FCS |   |
|------|------|-------|------|-------|---|
| C-DA | C-SA | S-TAG | C-TAG | DATA | FCS |

The symbols are defined as follows:
C-DA: customer destination MAC address;
C-SA: customer source MAC address;
C-TAG: customer 802.1Q tag;
S-TAG: service 802.1Q tag
DATA: customer data;
C-FCS: customer check sum; and
FCS: Frame check sum.

When the packet arrives at N-PE, the address of the related backbone bridge edge node may be found, according to the customer destination address. Accordingly, Backbone Destination Address (B-DA) and Backbone Source Address (B-SA) are inserted in the packet. Meanwhile, Service Instance TAG (I-TAG) and Backbone VLAN TAG (B-TAG) fields are inserted in the packet. The I-TAG, as an inner tag, provides a Service Instance ID (SID) having at least 20 bits, for indicating various service instances. B-TAG, as an outer tag, indicates the various service types provided by the backbone provider (such as audio, video, and so on), or indicates different domains or different service providers. According to B-DA, B-SA, and B-TAG, the backbone nodes perform forwarding, which is actually equivalent to establishing a tunnel.

There are two ways to insert B-TAG and I-TAG.

1. S-TAG mode: A S-TAG of a packet is first identified, and then the S-TAG is mapped to an I-TAG that is found by searching an internal mapping table. Because the function of I-TAG is same as that of S-TAG, the transformed packet no longer carries S-TAG, and the format of the transformed packet is as follows:

| B-DA | B-SA | B-TAG | I-TAG | C-DA | C-SA | C-TAG | DATA | B-FCS |
|------|------|-------|-------|------|------|-------|------|-------|

2. Transparent mode: it neither processes the S-TAG of the packet, nor performs the related mapping. All of the packets are assigned with the same I-TAG and B-TAG for transmission. The user packet (including S-TAG) is transmitted transparently without any modification. The format of the packet is shown as follows:

| B-DA | B-SA | B-TAG | I-TAG | C-DA | C-SA | S-TAG | C-TAG | DATA | FCS | B-FCS |
|------|------|-------|-------|------|------|-------|-------|------|-----|-------|

When the customer data arrives at the peer backbone node, B-DA, B-SA, B-TAG, and I-TAG fields are removed. If it is in the S-TAG mode, a S-TAG may be obtained by searching the mapping table with reference to the I-TAG, and then the packet is re-encapsulated. If it is in the transparent mode, TAG mapping is not required anymore. After the packet is processed, it is directly forwarded to a U-PE, according to C-DA. The U-PE subsequently removes S-TAG and forwards the packet to the user.

In practical applications, the backbone network may be very huge. To solve this problem, the backbone network is divided into different layers, each of which is further partitioned into different domains, and various B-TAGs are assigned for the respective domains in each different layer. FIG. 2 shows a Mac-in-Mac hierarchical application in the related art, in which the backbone network is divided into two layers, i.e. a first layer and a second layer. The first layer is further divided into four domains A, B, C, and D, each of which has its own B-TAG. During the data forwarding among the different domains, it is required to replace the corresponding B-TAG, while keeping the I-TAG unchanged during the whole data transmission procedure.

The devices in FIG. 2 are respectively:

BB: Backbone Provider Bridge;

PB: Provider Bridge (as defined by 802.1ad);

BB PB: Backbone Provider Bridge Edge, i.e. the edge devices between the backbone network and network provider; and BB BB: Backbone Provider Bridge Layer Edge, i.e. the edge device between the backbone network and network provider layer.

The processing on a user packet is shown as follows:

At PB, the user packet is encapsulated in the form of QinQ. At BB PB, the S-TAG of the user packet is mapped to an I-TAG of Mac-in-Mac, which consists of a SID having at least 20 bits, and at last a B-TAG is encapsulated in the packet for transmission. At BB BB, the original B-TAG is mapped to a new B-TAG, and the packet is transmitted to the peer BB BB, and then transmitted to the peer BB PB via B-TAG mapping. The peer BB PB maps the I-TAG back to S-TAG and removes the Mac-in-Mac header, then transmits the packet to the peer PB finally. The peer PB processes and transmits the packet to the peer user.

In the technical solution of the related art, each domain of the various network layers cannot decide the allocation of I-TAG on its own. The I-TAG is globally valid in the backbone network and kept unchanged, therefore I-TAG cannot be extended anymore.

SUMMARY

The disclosure is to provide a method and system for establishing a hierarchical network with Backbone Provider Bridges, so as to realize a hierarchical network and enhance the scalability of the network. It also provides a method and device for transmitting data using said system, so as to realize data transmission in the hierarchical network system with Provider Backbone Bridges.

An embodiment of the disclosure provides a method for establishing a hierarchical network to support Provider Backbone Bridges. The method includes:

dividing the network into a plurality of layers, and partitioning each layer into at least one domain;

assigning, by each domain, a service tag for its local domain in its own way, according to a user type ID of a lower layer which accesses the local domain;

establishing and saving a mapping relationship between the service tag of the local domain and the service tags of the other domains in the same layer; and learning, by an edge device of each domain, Media Access Control (MAC) addresses according to a predefined rule.

An embodiment of the disclosure provides a hierarchical network system with Provider Backbone Bridges, in which:

a network is divided into a plurality of layer, each layer including at least one domain, and each domain including an assigning module, a mapping module and an edge device having a MAC address forwarding table;

the assigning module is adapted to assign a service tag for its local domain in its own way according to a user type ID of a lower layer which accesses the local domain; and the mapping module is adapted to establish and save a mapping relationship between the service tag of the local domain and the service tags of the other domains in the same layer.

An embodiment of the disclosure further provides a method for transmitting data in a hierarchical network system with Provider Backbone Bridges. The method includes:

receiving, by a domain in a local layer, a data packet from a domain in a lower layer at local side; encapsulating the data packet; and forwarding the encapsulated data packet to a domain in an upper layer at local side, until the encapsulated data packet arrives at a peer end in a top layer; and upon receiving the data packet by the peer end in the top layer, de-encapsulating the data packet; configuring a corresponding service tag in the de-encapsulated data packet and forwarding the configured data packet to a domain in a lower layer, until the configured data packet arrives at a destination peer.

An embodiment of the disclosure further provides a device for transmitting data. The device includes:

an encapsulating module, adapted to encapsulate a data packet in a domain of its local layer upon receiving the data packet from a domain in a lower layer at local side, and forwarding the encapsulated data packet to a domain in an upper layer at local side, until the encapsulated data packet arrives at a peer end in a top layer; and a de-encapsulating module, adapted to de-encapsulate the data packet upon the peer end in the top layer receiving the data packet, to configure a corresponding service tag in the de-encapsulated data packet, and to forward the configured data packet to a domain in a lower layer, until the configured data packet arrives at a destination peer.

In summary, according to the technical solutions proposed in the embodiments of the disclosure, each network layer only manages itself, and the sub-layers are isolated from each other, which not only simplifies the network management but also improves the network security. Hierarchical user access authority is realized through managing the tag allocation by the users in each layer on their own. Meanwhile, it breaks through the number restriction imposed by the existing VLAN, which significantly improves the networking scalability. As for each network layer, only the edge devices of the network layer have to learn MAC addresses, the intermediate nodes therein can be regular switches, thereby saving the cost of networking.

DETAILED DESCRIPTION

In the following, the disclosure will be explained in detail by reference to the accompanying figures and embodiments, which is not intended to limit the disclosure.

Embodiment One

Figure 1:
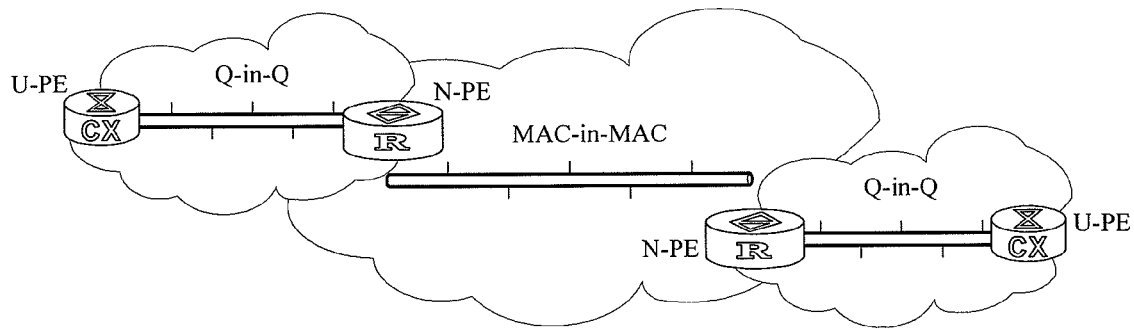
FIG. 1 is a schematic view of a typical Mac-in-Mac networking application.
Figure 2:
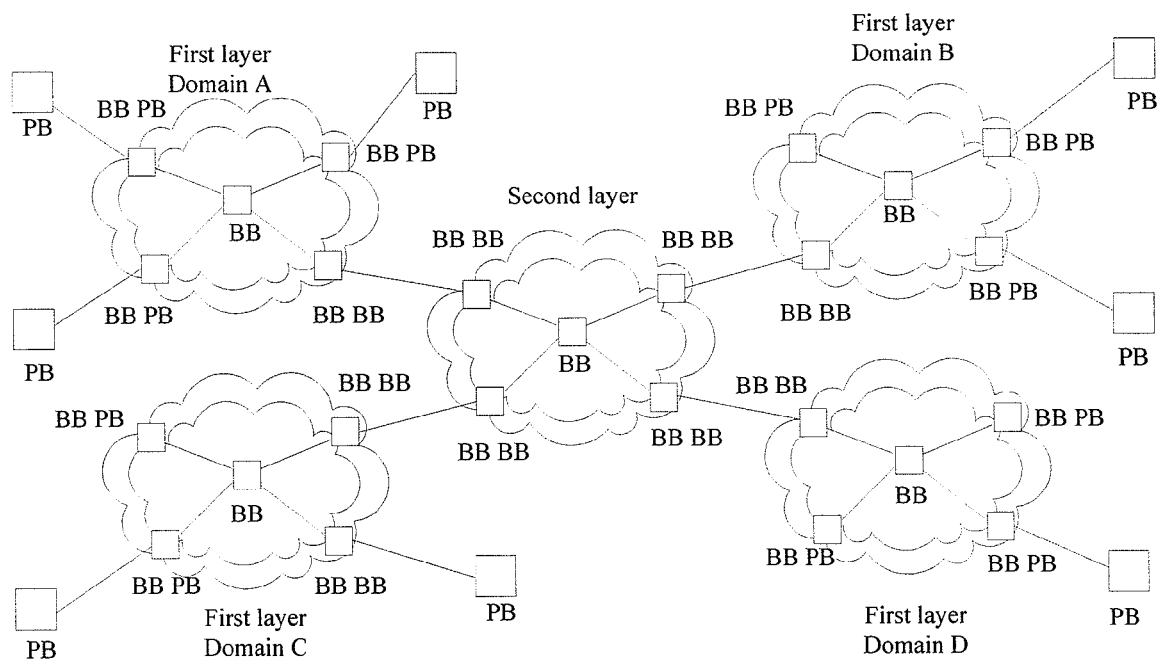
FIG. 2 is a schematic view of a Mac-in-Mac hierarchical application.
Figure 3:
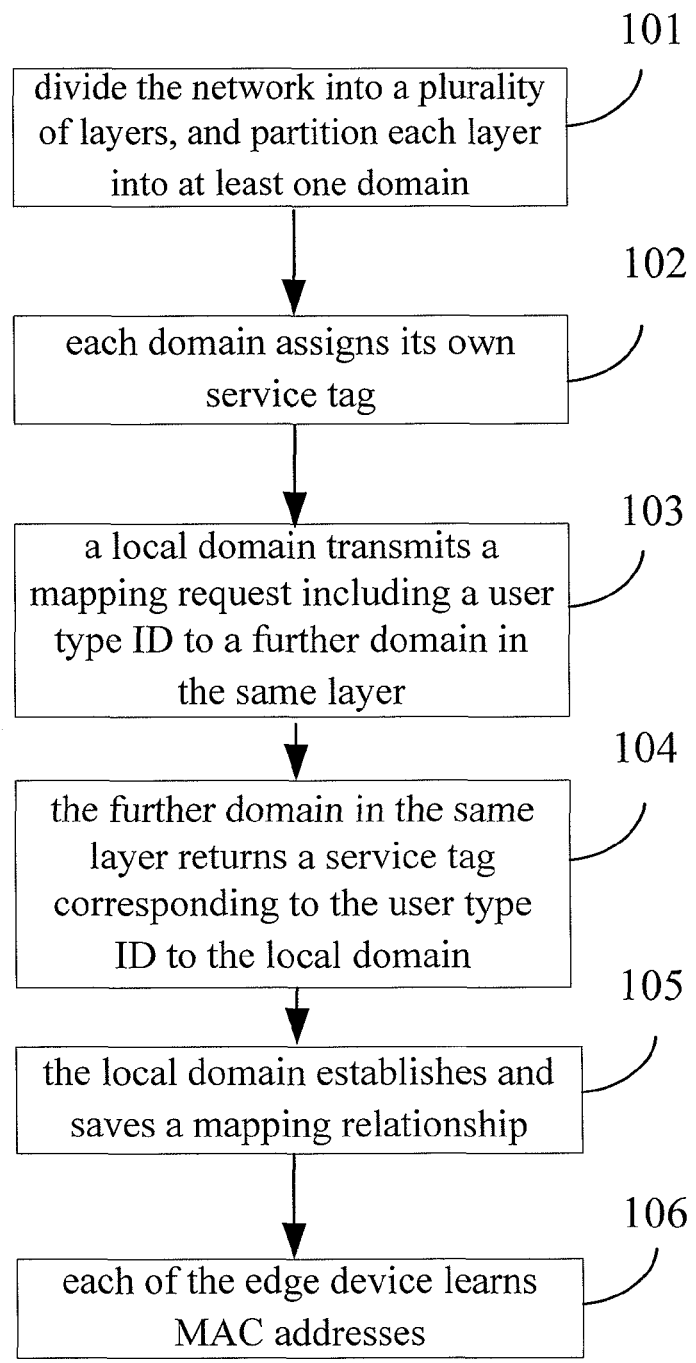
FIG. 3 is a flow chart of a method for establishing a hierarchical network with provider backbone bridges, according to an embodiment of the disclosure.

As shown in FIG. 3, an embodiment of the method for establishing a hierarchical network with provider backbone bridges includes as follows:

Block 101: A network, which supports Mac-in-Mac, is divided into several layers, and each layer is further partitioned into a plurality of domains.

Block 102: Each of the domains assigns a service tag for its local domain in its own way, according to a user type ID of a lower layer which accesses the local domain, wherein the service tag is valid only in the local domain. For example, a local domain assigns a service tag 1 for itself, according to a user type ID (ID=A) of a lower layer which accesses the local domain, wherein the service tag 1 indicates a voice service. This local domain also assigns a service tag 2 for itself according to another user type ID (ID=B) which accesses the local domain, where the service tag 2 indicates a video service.

Block 103: The local domain transmits a mapping request for a service tag, which includes the user type ID corresponding to the service tag, to a further domain in the same layer via a signaling protocol (such as GMPLS signaling protocol). For example, a mapping request for service tag 1 of the local domain is transmitted, and the mapping request includes the user type ID, i.e. ID=A, which corresponds to the service tag 1.

Block 104: After receiving the mapping request, the further domain finds a corresponding service tag in its own domain, according to the user type ID in the mapping request. For example, the corresponding service tag is service tag 5, which represents a voice service as well. The service tag is then returned to the local domain via a mapping response.

Block 105: Upon receiving the mapping response, the local domain establishes a mapping relationship between the service tag of the local domain and that of the further domain, and saves the mapping relationship in the local domain. For example, a mapping relationship between service tag 1 of the local domain and service tag 5 of a further domain is established and saved.

Block 106: Edge devices of each domain learn the MAC addresses, according to a predefined rule. One rule is that the edge devices of each domain learn the MAC addresses of edge devices of each domain in the same layer and the MAC addresses of edge devices of each domain in the lower layer. Another rule is that the edge devices of each domain learn the MAC addresses of the edge devices of each domain in the same layer and the MAC addresses of all user terminals in the bottom layer.

Embodiment Two

Figure 4:
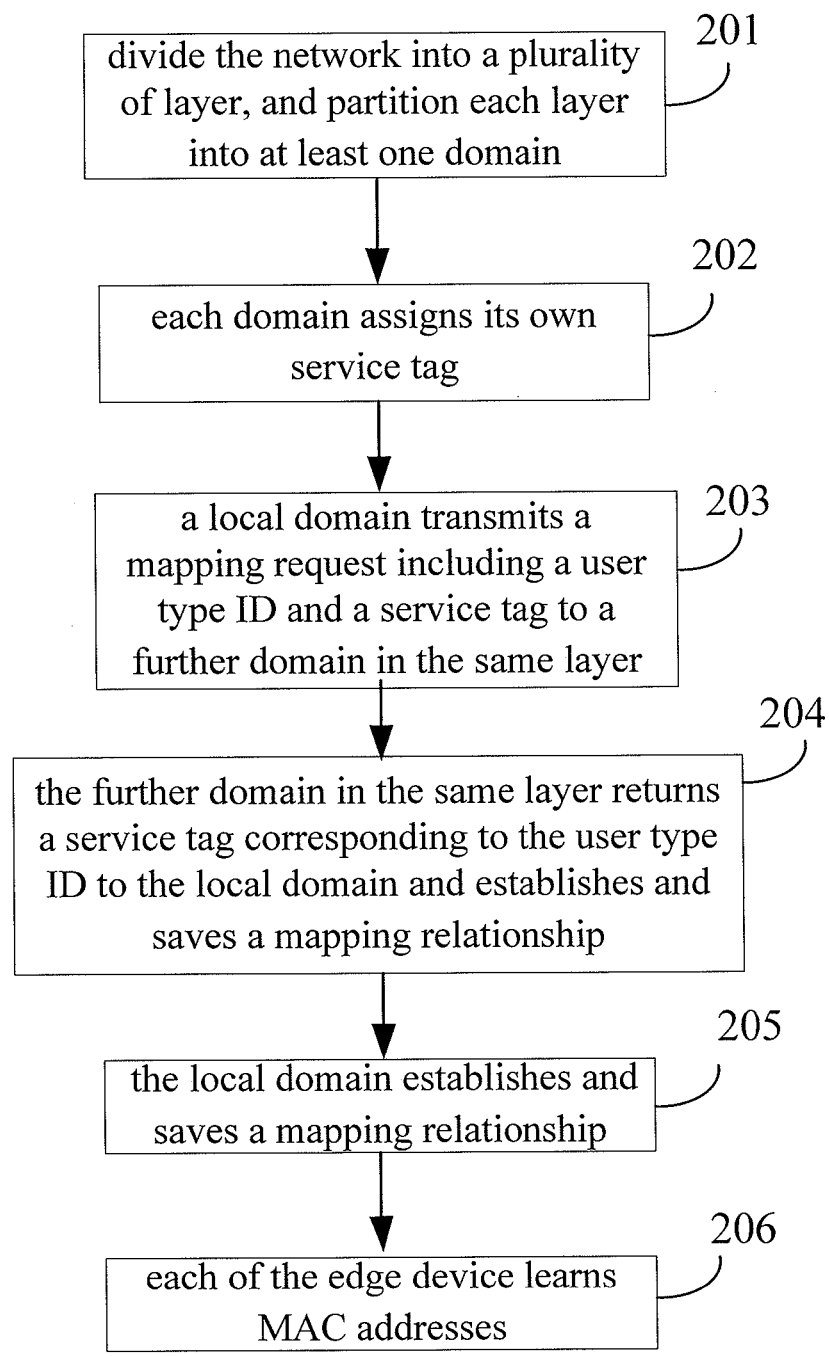
FIG. 4 is a flow chart of a method for establishing a hierarchical network with provider backbone bridges, according to another embodiment of the disclosure.

As shown in FIG. 4, another embodiment of the method for establishing a hierarchical network with provider backbone bridges comprises the following steps:

Block 201: A network supporting Mac-in-Mac is divided into several layers, and each layer is further partitioned into a plurality of domains.

Block 202: Each of the domains (e.g. a local domain) assigns a service tag for its local domain in its own way, according to a user type ID of a lower layer which accesses the local domain, wherein the service tag is valid only in the local domain.

Block 203: The local domain transmits a mapping request for a service tag, which includes the service tag and a user type ID corresponding to the service tag, to a further domain in the same layer via a signaling protocol (such as GMPLS signaling protocol). For example, the mapping request includes the service tag 2 (representing a video service) of the local domain and its corresponding user type ID=B.

Block 204: After receiving the mapping request, the further domain finds a corresponding service tag in its own domain, according to the user type ID in the mapping request, and returns the corresponding service tag to the local domain via a mapping response. In the meantime, a further domain also establishes and saves a mapping relationship between the corresponding service tag and the service tag of the local domain. For example, after finding a service tag 7 that corresponds to the ID=B, a further domain establishes and saves the mapping relationship between the service tag 7 and the service tag 2 of the local domain.

Block 205: Upon receiving the mapping response, the local domain establishes a mapping relationship between the service tag 2 of the local domain and the service tag 7 of a further domain, and saves the mapping relationship.

Block 206: The edge devices of each domain learn the MAC addresses, according to a predefined rule. One rule is that the edge devices of each domain learn the MAC addresses of the edge devices of each domain in the same layer and the MAC addresses of the edge devices of each domain in the lower layer. Another rule is that the edge devices of each domain learn the MAC addresses of the edge devices of each domain in the same layer and the MAC addresses of all user terminals in the bottom layer.

Establishing the mapping relationship between the service tags in the above Embodiments One and Two can be realized by configuring a corresponding relationship between various I-TAGs under the help of the configuration schemes provided by the devices.

Embodiment Three

Figure 5:
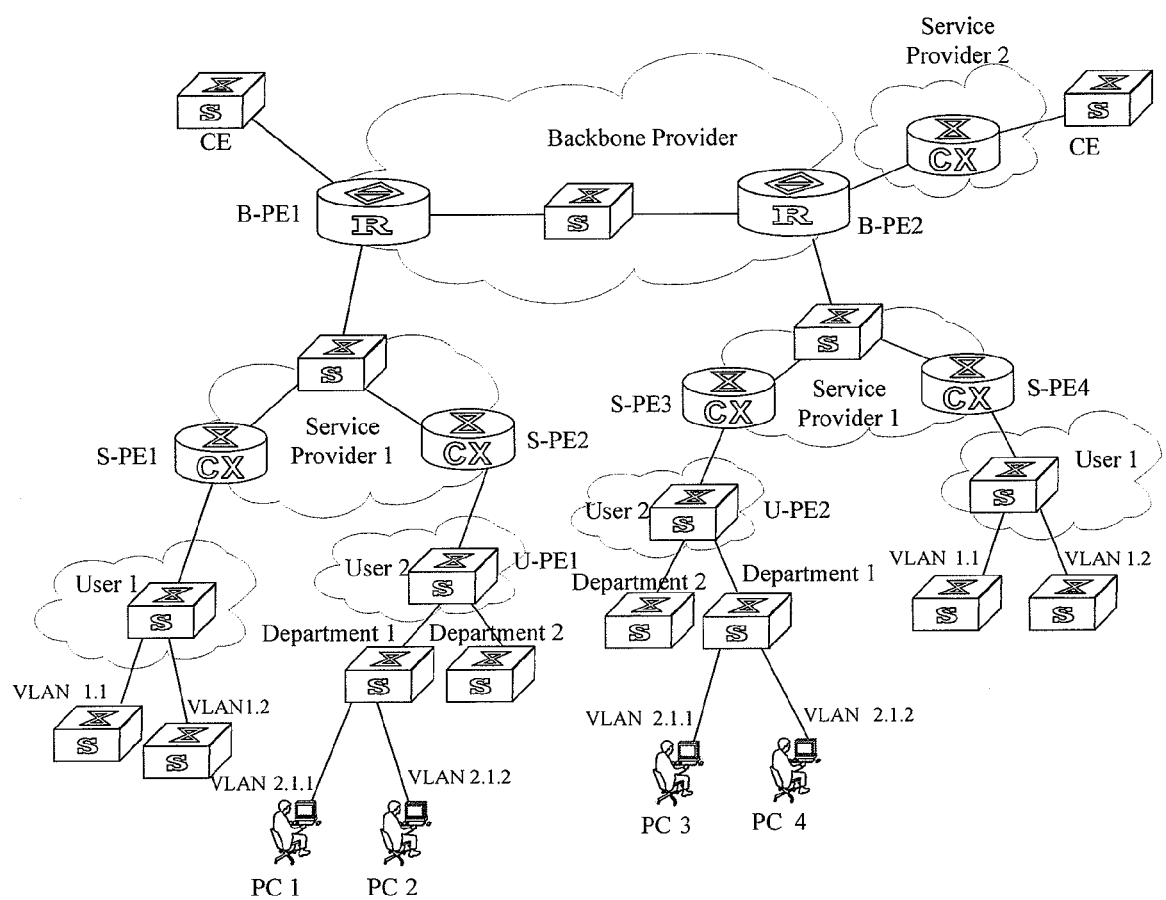
FIG. 5 is a schematic view of a hierarchical network system established by using the method based on provider backbone bridges, according to an embodiment of the disclosure.

FIG. 5 illustrates an embodiment of a network system established by using the method based on provider backbone bridges, according to the disclosure. The system comprises three layers, i.e. a backbone provider network, a service provider network and a user network, each layer employing Mac-in-Mac technology. The edge devices of the backbone provider network are designated as B-PE; the edge devices of the service provider network are designated as S-PE, and the edge devices of the user network are designated as U-PE. Normal switches (supporting 802.1Q) are used inside each network layer.

There are two users, i.e. user 1 and user 2, in the user network layer. User 1 is partitioned into two domains and user 2 is also partitioned into two domains, thus there are four domains in total. The two domains of user 1 (i.e. two branches) access two domains of the service provider 1 through S-PE1 and S-PE4, respectively, and the two domains of user 2 (i.e. two branches) access two domains of the service provider 1 through S-PE2 and S-PE3, respectively.

User 2 is further divided into two departments, i.e. department 1 and department 2. Department 1 accesses the two domains of user 2 via U-PE1 and U-PE2, respectively. Department 1 is divided into different VLANs for distinguishing different offices, and each office has a plurality of terminals. For example, there are two terminals PC1 and PC3 in the office represented by VLAN2.1.1, and two terminals PC2 and PC4 in the office represented by VLAN2.1.2.

In the user network layer, each of the four domains assigns a service tag for its local domain in its own way, respectively, and saves in its local domain the mapping relationship between its local domain and the other three domains. For example, the two domains of user 2 respectively assign service tags U-I-TAG-1 and U-I-TAG-2 according to their respective internal schemes, and then the mapping relationship between U-I-TAG-1 and U-I-TAG-2 are saved in the U-PE1 and U-PE2, respectively.

In the service provider network layer, there are two service providers, i.e. service provider 1 and service provider 2. Service provider 2 has only one domain, while service provider 1 is divided into two domains that access the backbone provider network via B-PE1 and B-PE2, respectively.

In the service provider network layer, each of the three domains assigns a service tag for its local domain in its own way, respectively, and saves in its local domain the mapping relationship between its local domain and the other two domains. For example, the two domains of service provide 1 respectively assign service tags S-I-TAG-1 and S-I-TAG-2 according to their respective internal schemes, and the mapping relationship between S-I-TAG-1 and S-I-TAG-2 is saved in S-PE2 and S-PE3, respectively.

The backbone provider assigns a service tag, such as B-I-TAG, in its internal way.

The above system realizes Mac-in-Mac hierarchical application without interference between each layer.

Embodiment Four

Figure 6:
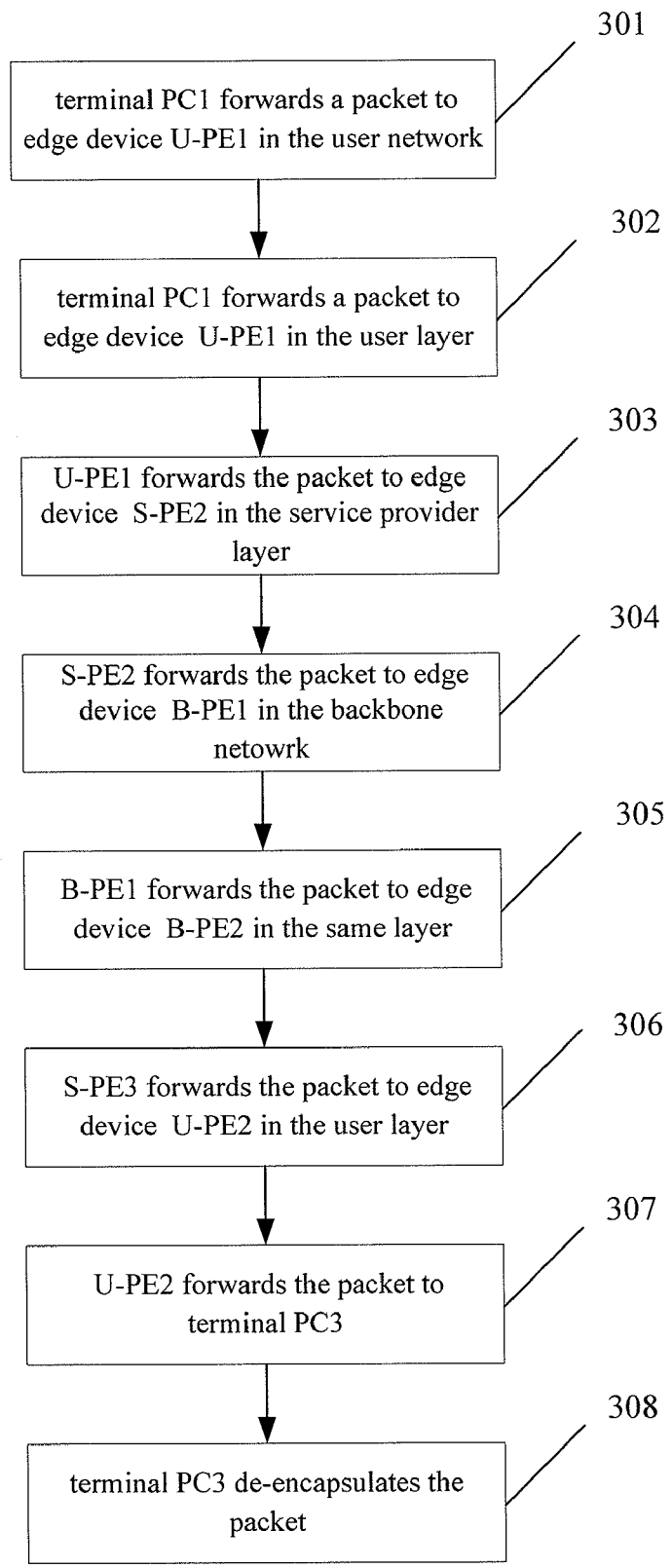
FIG. 6 is a flow chart of data transmission in a hierarchical network system established by using the method based on provider backbone bridges, according to an embodiment of the disclosure.
Figure 7:
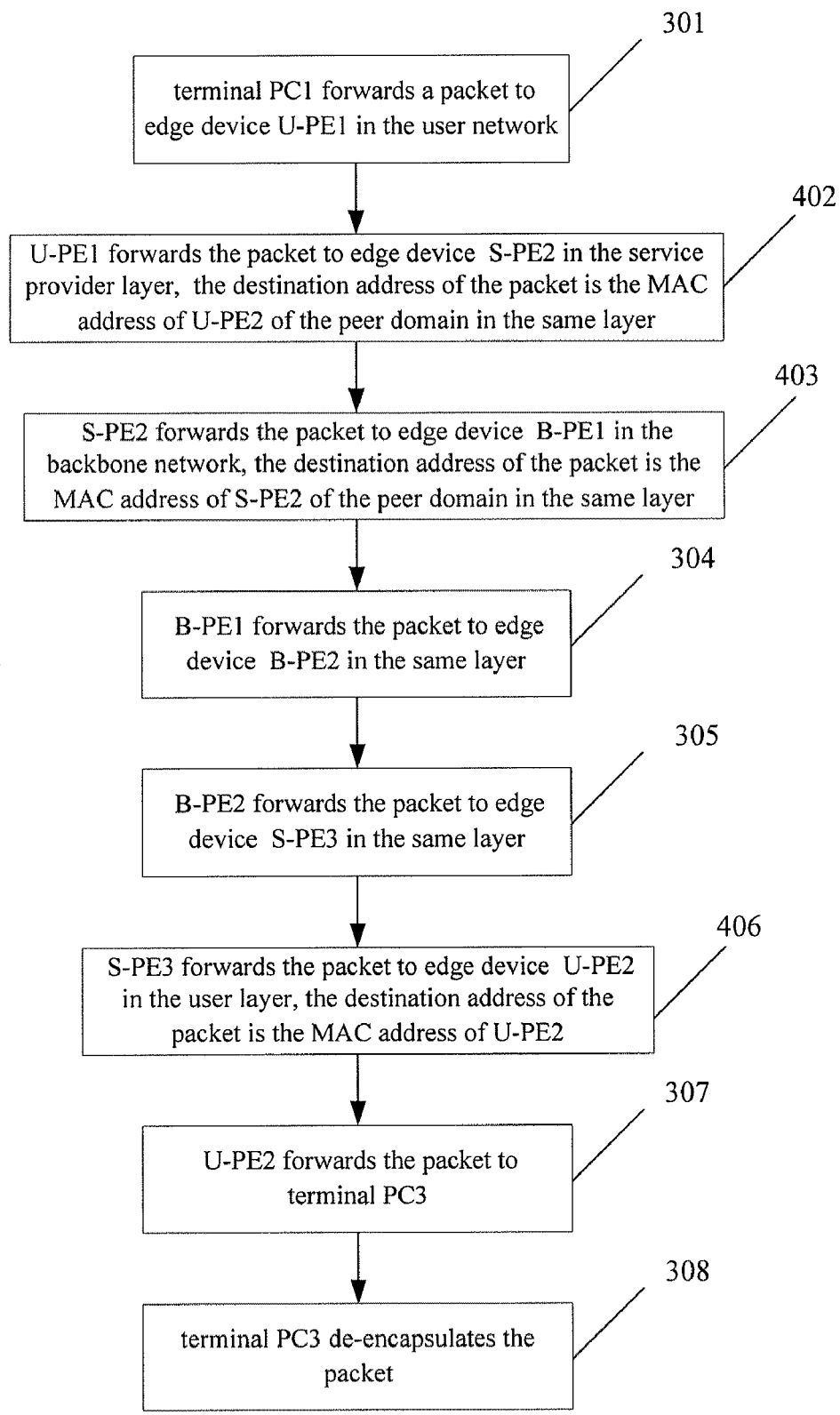
FIG. 7 is a flow chart of data transmission in a hierarchical network system according to another embodiment of the disclosure.
Figure 8:
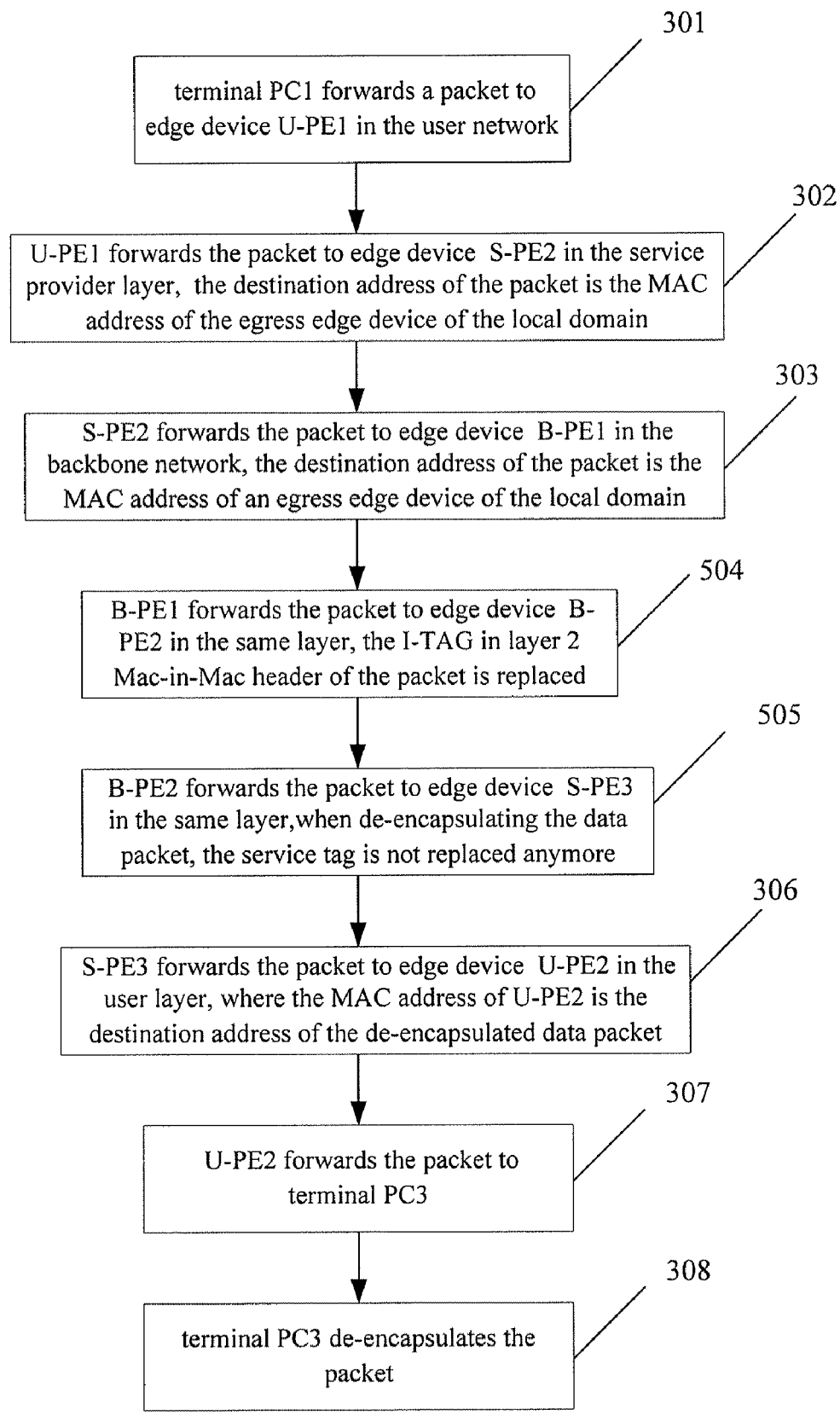
FIG. 8 is a flow chart of data transmission in a hierarchial network system according to another embodiment of the disclosure.

FIG. 6 illustrates a flow chart of data transmission performed in a hierarchical network system established with provider backbone bridges, according to an embodiment of the disclosure. This method is illustrated by taking the data transmission in the system of Embodiment Three (as shown in FIG. 5) as an example.

PE device in the system of Embodiment Three identifies a layer 2 Mac-in-Mac header, which is inside the current Mac-in-Mac header. In other words, the PE device identifies a peer I-TAG in the layer 2 Mac-in-Mac header, finds a mapping relationship between the peer I-TAG and a local I-TAG in the same layer, and then replaces the peer I-TAG with the local I-TAG. Meanwhile, the PE device replaces the peer B-TAG in the layer 2 Mac-in-Mac header with a new B-TAG (a new B-TAG obtained based on the local I-TAG in the same layer) in the Mac-in-Mac. The PE device then transmits the replaced packet to a peer PE after recalculating the check sum. Moreover, edge devices of each layer in the system learn the MAC addresses of the edge devices of each domain in the same layer, and the MAC addresses of all user terminals in the bottom layer. For example, in the user network layer, U-PE1 and U-PE2 not only learn the MAC address of each other, but also learn the MAC addresses of the user terminals (i.e. PC1 and PC3) of the both sides in the bottom layer. In the service provider network layer, S-PE2 and S-PE3 learn the MAC address of each other as well as the MAC addresses of the user terminals of the both sides in the bottom layer. In the backbone provider network layer, B-PE1 and B-PE2 learn the MAC address of each other as well as the MAC addresses of the user terminals of the both sides in the bottom layer. Accordingly, when encapsulating a destination MAC address in the data packet according to the learnt MAC addresses, the MAC address of the egress edge device in the local domain is encapsulated as the destination address. Generally, a domain includes an ingress edge and an egress edge; and data packet enters into the domain via the ingress edge and is forwarded to other neighboring domains through the egress edge. In certain circumstances, the ingress edge and egress edge can be the same device.

The detailed procedure of packet forwarding in the case that terminal PC1 accesses terminal PC3 comprises:

Block 301: a PC1 packet is forwarded from terminal PC1 to edge device U-PE1 of the upper layer, i.e. the user network. The source address and destination address as well as a user tag are encapsulated in the packet. Thus, the encapsulated packet has the following form:

MAC-PC3+MAC-PC1+U-TAG+DATA+FCS, where the destination address is the MAC address of PC3, the source address is the MAC address of PC1, U-TAG is the user tag of VLAN2.1.1, DATA is the user data and FACS is the check sum.

Block 302: a U-PE1 packet is forwarded from the edge device U-PE1 to edge device S-PE2 of the upper layer, i.e. the service provider network. The source address and destination address as well as the outer tag and the service tag U-I-TAG-1 are encapsulated in the packet. The encapsulated packet has the following form:

MAC-S-PE2+MAC-U-PE1+U-B-TAG-1+U-I-TAG-1+PC1 packet+FCS, where the destination address is the MAC address of the egress edge device of the local domain. In this example, the egress edge device of the local domain is the ingress edge device S-PE2 of the upper service provider layer. As a result, the MAC address of S-PE2 is taken as the destination MAC address. The source address is the MAC address of U-PE1, U-B-TAG-1 is the outer tag for forwarding the packet from U-PE1 to S-PE2 in the Mac-in-Mac.

Block 303: a S-PE2 packet is forwarded from the edge device S-PE2 to an edge device B-PE1 of the upper layer, i.e. the backbone provider network. The source address and destination address as well as the outer tag and the service tag S-I-TAG-1 are encapsulated in the packet. Thus, the encapsulated packet has the following form:

MAC-B-PE1+MAC-S-PE2+S-B-TAG-1+S-I-TAG-1+U-PE1 packet+FCS;

where the destination address is the MAC address of an egress edge device of the local domain. For the purpose of simplification, as an example, the egress edge device of the local domain and the ingress edge device of the upper layer are overlapped with each other (the two edge devices may be the same device in a practical application). That is, the egress edge device of the local domain is B-PE1. Thus, the MAC address of B-PE1 is taken as the destination MAC address. The source address is the MAC address of S-PE2, and S-B-TAG-1 is the outer tag for forwarding the packet from S-PE2 to B-PE1 in the Mac-in-Mac.

Block 304: a B-PE1 packet is forwarded from the edge device B-PE1 to edge device B-PE2 in the same layer. The source address and destination address as well as the outer tag and the service tag B-I-TAG are encapsulated in the packet. Thus, the encapsulated packet has the following form:

MAC-B-PE2+MAC-B-PE1+B-B-TAG+B-I-TAG+S-PE2 packet+FCS;

where the destination address is the MAC address of the egress edge device of the local domain, that is, the MAC address of B-PE2. The source address is the MAC address of B-PE1, and B-B-TAG is the outer tag for forwarding the packet from B-PE1 to B-PE2 in the Mac-in-Mac.

Block 305: a B-PE2 packet is forwarded from the edge device B-PE2 to edge device S-PE3 of a lower layer, i.e. the service provider network. When de-encapsulating the data packet, the service tag S-I-TAG-1 is replaced with a service tag S-I-TAG-2, according to the mapping relationship between the service tag S-I-TAG-1 and the service tag S-I-TAG-2. Moreover, the source address, destination address and outer tag are encapsulated in the packet. Thus, the encapsulated packet has the following form:

MAC-S-PE3+MAC-B-PE2+S-B-TAG-2+S-I-TAG-2+
U-PE1 packet+FCS;

where the destination address is the MAC address of S-PE3, the source address is the MAC address of B-PE2, S-B-TAG-2 is the outer tag for forwarding the packet from B-PE2 to S-PE3 in the Mac-in-Mac.

Block 306: a S-PE3 packet is forwarded from the edge device S-PE3 to an edge device U-PE2 of a lower layer, i.e. the user network. When de-encapsulating the data packet, the service tag U-I-TAG-1 is replaced with a service tag U-I-TAG-2, according to a mapping relationship between the service tag U-I-TAG-1 and the service tag U-I-TAG-2. Moreover, the source address, destination address and the outer tag are encapsulated in the packet. Thus, the encapsulated packet has the following form:

MAC-U-PE2+MAC-S-PE3+U-B-TAG-2+U-I-TAG-
2+PC1 packet+FCS;

where MAC-U-PE2 is the destination address of the de-encapsulated data packet, i.e. the MAC address of U-PE2. MAC-S-PE3 is the source address of the de-encapsulated data packet, i.e. the MAC address of S-PE3. U-B-TAG-2 is the outer tag for forwarding the packet from S-PE3 to U-PE2 in the Mac-in-Mac.

Block 307: a U-PE2 packet is forwarded from the edge device U-PE2 to the terminal PC3, the content of the PC1 packet is then obtained through de-encapsulation.

Block 308: the terminal PC3 de-encapsulates the U-PE2 packet, i.e. PC1 packet, and extracts the DATA received from the user PC1.

Embodiment Five

The disclosure also provides another embodiment of data transmission which is different from Embodiment Four. In this embodiment, when terminal PC1 accesses PC3 through packet forwarding, the MAC addresses learnt by the edge devices of each network layer are different from those in Embodiment Four. In specific, the edge devices of each network layer learn the MAC addresses of the edge devices of each domain in the same layer as well as the MAC addresses of those in the lower layer. For example, in the service provider layer, S-PE2 and S-PE3 learn the MAC address of each other as well as the MAC addresses of U-PE1 and U-PE2 in the lower layer. Accordingly, the destination address in the encapsulated data packet is also different. Specifically, the MAC address of the peer edge device in the same layer is encapsulated as the destination address. Thus, blocks 302 and 303 are replaced with the following blocks 402 and 403.

Block 402: A U-PE1 packet is forwarded from the edge device U-PE1 to edge device S-PE2 of the upper layer, i.e. the service provider network. The source address and destination address as well as the outer tag and the service tag U-I-TAG-I are encapsulated in the packet. Thus, the encapsulated packet has the following form:

MAC-U-PE2+MAC-U-PE1+U-B-TAG-1+U-I-TAG-
1+PC1 packet+FCS;

where the destination address is the MAC address of U-PE2 of the peer domain in the same layer. The source address is the MAC address of U-PE1, and U-B-TAG-1 is the outer tag for forwarding the packet from U-PE1 to S-PE2 in the Mac-in-Mac.

Block 403: A S-PE2 packet is forwarded from the edge device S-PE2 to edge device B-PE1 of the upper layer, i.e. the backbone provider network. The source address and destination address as well as the outer tag and the service tag S-I-TAG-1 are encapsulated in the packet. Thus, the encapsulated packet has the following form:

MAC-S-PE3+MAC-S-PE2+S-B-TAG-1+S-I-TAG-1+
U-PE1 packet+FCS;

where the destination address is the MAC address of S-PE2 of the peer domain in the same layer. The source address is the MAC address of S-PE2, and S-B-TAG-1 is the outer tag for forwarding the packet from U-PE1 to S-PE2 in the Mac-in-Mac.

Accordingly, the destination address in the de-encapsulated data packet is also different, thus block 306 is replaced with the following block 406:

Block 406: A S-PE3 packet is forwarded from the edge device S-PE3 to edge device U-PE2 of the lower layer, i.e. the user network. When de-encapsulating the data packet, the service tag U-I-TAG-1 is replaced with the service tag U-I-TAG-2, according to the mapping relationship between the service tag U-I-TAG-I and the service tag U-I-TAG-2. Moreover, the source address, destination address and the outer tag are encapsulated in the packet. Thus, the encapsulated packet has the following form:

MAC-U-PE2+MAC-U-PE1+U-B-TAG-2+U-I-TAG-
2+PC1 packet+FCS;

where the destination address is the MAC address of U-PE2. The source address is the MAC address of S-PE3. U-B-TAG-2 is the outer tag for forwarding the packet from S-PE3 to U-PE2 in the Mac-in-Mac.

The other blocks are the same as that of Embodiment Four, the detailed description of which is omitted here for simplification.

Embodiment Six

The disclosure also provides another embodiment of data transmission which is different from Embodiment Four. In this embodiment, when the terminal PC1 accesses the terminal PC3 through packet forwarding, in the transmission of data packet from the bottom layer to the upper layers at local side, and in the transmission of data packet within the top layer after it arrives at the top layer, I-TAG can be replaced in advance, according to the mapping relationships pre-established by the system, instead of replacing I-TAG in the transmission of the data packet from the top layer to the lower layers. Thus, blocks 304 and 305 are replaced with the following blocks 504 and 505.

Block 504: A B-PE1 packet is forwarded from the edge device B-PE1 to an edge device B-PE2 in the same layer. The source address and destination address as well as the outer tag and the service tag B-I-TAG are encapsulated in the packet. Meanwhile, the I-TAG in layer 2 Mac-in-Mac header of the packet is replaced. Specifically, S-I-TAG-1 is replaced with S-I-TAG-2, according to a pre-established relationship between S-I-TAG-1 and S-I-TAG-2. The obtained packet has the following form:

MAC-B-PE2+MAC-B-PE1+B-B-TAG+B-I-TAG+new packet+FCS;

where the destination address is the MAC address of B-PE2, the source address is the MAC address of B-PE1, and B-B-TAG is the outer tag for forwarding the packet from B-PE1 to B-PE2 in the Mac-in-Mac. The new packet is:

MAC-B-PE1+MAC-S-PE2+S-B-TAG-1+S-I-TAG-2+U-PE1 packet+FCS.

Block 505: A B-PE2 packet is forwarded from the edge device B-PE2 to edge device S-PE2 of the lower layer, i.e. the service provider network. When de-encapsulating the data packet, the service tag is not replaced anymore, only the source address, destination address, and outer tag are encapsulated in the packet. The encapsulated packet has the following form:

MAC-S-PE3+MAC-B-PE2+S-B-TAG-2+S-I-TAG-2+U-PE1 packet+FCS;

where MAC-S-PE3 is the destination address in the de-encapsulated data, i.e. the MAC address of S-PE3, MAC-B-PE2 is the source address in the de-encapsulated data, i.e. the MAC address of B-PE2, S-B-TAG-2 is the outer tag for forwarding the packet from B-PE2 to S-PE3 in the Mac-in-Mac.

The other blocks are the same as those of Embodiment Four, the detailed of which is omitted here for simplification.

The above is just description of the preferred embodiments of the disclosure. Any variation and modification made by those skilled in the art within the scope of the technical solution of the disclosure are included in the scope of protection of the disclosure.

What is claimed is:

1. A method for establishing a hierarchical network to support Provider Backbone Bridges, comprising:
    dividing the network into a plurality of layers, and partitioning each layer into at least one domain;
    assigning a service tag in a local domain's own way, according to a user type ID of a lower layer which accesses the local domain;
    establishing and saving a mapping relationship between the service tag of the local domain and the service tags of the other domains in the same layer if there are two or more domains in the same layer; and
    learning, by an edge device of each domain, Media Access Control (MAC) addresses according to a predefined rule;
    wherein each layer of the network employs Mac-in-Mac technology.

2. The method of claim 1, wherein the establishing a mapping relationship comprises: establishing the mapping relationship between the service tag of the local domain and the service tags of the other domains in the same layer by means of a configuration scheme provided by a device.

3. The method of claim 1, wherein the learning MAC addresses comprises: learning, by the edge devices of each domain, MAC addresses of edge devices of each domain in the same layer and MAC addresses of edge devices of each domain in the lower layer.

4. The method of claim 1, wherein the learning MAC addresses comprises: learning, by the edge device of each domain, MAC addresses of edge devices of each domain in the same layer and MAC addresses of all user terminals in the bottom layer.

5. A method for establishing a hierarchical network to support Provider Backbone Bridges, comprising:
    dividing the network into a plurality of layers, and partitioning each layer into at least one domain;
    assigning a service tag in a local domain's own way, according to a user type ID of a lower layer which accesses the local domain;
    establishing and saving a mapping relationship between the service tag of the local domain and the service tags of the other domains in the same layer if there are two or more domains in the same layer; and
    learning, by an edge device of each domain, Media Access Control (MAC) addresses according to a predefined rule;
    wherein the establishing a mapping relationship comprises:
    transmitting, by the local domain, a mapping request for a service tag to a further domain in the same layer, wherein the mapping request includes a user type ID of a lower layer which accesses the local domain;
    finding, upon receiving the mapping request by the further domain, a corresponding service tag of the further domain according to the user type ID in the mapping request, and returning the corresponding service tag of the further domain to the local domain through a mapping response; and
    establishing, upon receiving the mapping response by the local domain, the mapping relationship between the service tag of the local domain assigned, according to the user type ID and the corresponding service tag of the further domain in the mapping response.

6. A method for establishing a hierarchical network to support Provider Backbone Bridges, comprising:
    dividing the network into a plurality of layers, and partitioning each layer into at least one domain;
    assigning a service tag in a local domain's own way, according to a user type ID of a lower layer which accesses the local domain;
    establishing and saving a mapping relationship between the service tag of the local domain and the service tags of the other domains in the same layer if there are two or more domains in the same layer; and
    learning, by an edge device of each domain, Media Access Control (MAC) addresses according to a predefined rule;
    wherein the establishing a mapping relationship comprises:
    transmitting, by the local domain, a mapping request for a service tag to a further domain in the same layer, wherein the mapping request includes a user type ID of a lower network layer which accesses the local domain, and the service tag of the local domain assigned according to the user type ID;
    finding, upon receiving the mapping request by the further domain, a corresponding service tag of the further domain according to the user type ID in the mapping request, and returning the corresponding service tag of the further domain to the local domain through a mapping response, and establishing and saving the mapping relationship between the service tag of the local domain and the corresponding service tag of the further domain; and
    establishing, upon receiving the mapping response by the local domain, the mapping relationship between the service tag of the local domain that corresponds to the user type ID and the corresponding service tag of the further domain in the mapping response.

* * * * *